(12) United States Patent
Meier

(10) Patent No.: US 7,568,756 B2
(45) Date of Patent: Aug. 4, 2009

(54) CROSSMEMBER

(75) Inventor: Steffen Meier, Freudental (DE)

(73) Assignee: Dr. Ing, h.c. F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 11/944,707

(22) Filed: Nov. 26, 2007

(65) Prior Publication Data

US 2008/0122260 A1    May 29, 2008

(30) Foreign Application Priority Data

Nov. 25, 2006 (DE) .................. 10 2006 055 736

(51) Int. Cl.
*B62D 25/14* (2006.01)
(52) U.S. Cl. .................... 296/193.02; 296/70
(58) Field of Classification Search .......... 296/70–74, 296/193.02, 29; 180/90
See application file for complete search history.

(56) References Cited

U.S. PATENT DOCUMENTS

| | | | |
|---|---|---|---|
| 3,376,947 A | | 4/1968 | Barenyi et al. |
| 4,671,536 A | * | 6/1987 | Yoshimura .................. 280/779 |
| 4,767,153 A | * | 8/1988 | Kawasaki et al. ...... 296/193.02 |
| 5,238,286 A | * | 8/1993 | Tanaka et al. .................. 296/70 |
| 6,450,533 B1 | * | 9/2002 | Kimura et al. ................ 280/779 |
| 6,523,878 B2 | * | 2/2003 | Scheidel ...................... 296/70 |
| 6,648,402 B2 | * | 11/2003 | Scheib et al. .......... 296/203.02 |
| 6,651,563 B2 | * | 11/2003 | Faber et al. ............. 102/202.11 |
| 6,685,259 B1 | | 2/2004 | Shimase et al. |
| 6,851,742 B1 | * | 2/2005 | Kubiak ................... 296/193.02 |
| 6,988,764 B2 | * | 1/2006 | Matsutani ............... 296/193.02 |
| 7,367,613 B2 | * | 5/2008 | Ellison et al. .......... 296/193.02 |
| 7,374,232 B2 | * | 5/2008 | Ellison et al. .......... 296/193.02 |
| 2004/0262954 A1 | * | 12/2004 | Scheib et al. .......... 296/193.02 |
| 2006/0017310 A1 | * | 1/2006 | Joo et al. ............... 296/193.02 |

FOREIGN PATENT DOCUMENTS

| | | |
|---|---|---|
| DE | 1255523 | 11/1967 |
| DE | 4336105 A1 | 4/1995 |
| DE | 19728557 A1 | 1/1998 |
| DE | 19752072 A1 | 5/1999 |
| DE | 19728557 B4 | 4/2006 |
| DE | 102005010161 A1 | 5/2006 |
| EP | 1731411 A1 | 12/2006 |
| FR | 2653087 A1 | 4/1991 |
| WO | 0117842 A1 | 3/2001 |

\* cited by examiner

*Primary Examiner*—Glenn Dayoan
*Assistant Examiner*—Gregory Blankenship

(57) ABSTRACT

A crossmember, such as a cockpit crossmember of a motor vehicle, is connected on the longitudinal end sides to A pillars of a motor vehicle front end structure. The crossmember is supported in the central region via a supporting frame against a longitudinal central tunnel. The supporting frame has two downwardly directed supporting elements and a connecting member connecting the two supporting elements at their lower end. The connecting member can be fixed to the longitudinal central tunnel via at least one fixing device, which permits the connecting member to be aligned with respect to the longitudinal central tunnel. This enables a stress-free and simple installation of the crossmember.

9 Claims, 3 Drawing Sheets

CROSSMEMBER

CROSS-REFERENCE TO RELATED APPLICATION

This application claims the priority, under 35 U.S.C. § 119, of German application DE 10 2006 055 736.0, filed Nov. 25, 2006; the prior application is herewith incorporated by reference in its entirety.

BACKGROUND OF THE INVENTION

Field of the Invention

The present invention relates to a crossmember, in particular a cockpit crossmember, in a motor vehicle. The crossmember is connected at both ends to the motor vehicle body, in particular to the A pillars, and is supported in a central region via a supporting frame against a longitudinal central tunnel of the motor vehicle. The supporting frame has two downwardly directed supporting elements and a connecting member connecting the two supporting elements at their lower end.

German patent DE 197 28 557 B4 discloses a fastening assembly for a crossmember in a motor vehicle, in which a crossmember is connected to the vehicle body, in particular to the A pillars, via holding elements. The crossmember is supported in a central region via a supporting frame against a longitudinal central tunnel of the motor vehicle, the supporting frame having two downwardly directed supporting elements and a connecting member connecting the two supporting elements at their lower end. The connecting member is designed here as a tunnel bracket and is welded to the longitudinal central tunnel of the motor vehicle. The welding of the tunnel bracket to the longitudinal central tunnel means that they are connected permanently and immovably to each other. In the case of the fastening assembly known from DE 197 28 557 B4, although manufacturing tolerances can be compensated for, the installation of the crossmember on the vehicle body proves to be relatively complicated.

BRIEF SUMMARY OF THE INVENTION

It is accordingly an object of the invention to provide a cross member for a motor vehicle which overcomes the above-mentioned disadvantages of the heretofore-known devices and methods of this general type and which provides for an improved embodiment that is distinguished, in particular, by a simplified installation of the crossmember on the vehicle body while having the option at the same time to compensate for manufacturing tolerances.

With the foregoing and other objects in view there is provided, in accordance with the invention, a crossmember in a motor vehicle, comprising:

the crossmember having two ends connected to a motor vehicle body of the motor vehicle;

a supporting frame supporting the crossmember in a central region against a longitudinal central tunnel of the motor vehicle, the supporting frame having two downwardly directed supporting elements and a connecting member connecting the two supporting elements at their lower ends;

one or more fixing devices configured to affix the connecting member to the longitudinal central tunnel and to align the connecting member on the longitudinal central tunnel.

In a preferred implementation of the invention, the crossmember is a cockpit crossmember and it is connected to the A-pillars of the motor vehicle body.

In other words, the present invention is based on the general concept of designing a connection, which was hitherto permanent, in particular welded, between a connecting member resting on a longitudinal central tunnel of the motor vehicle and the longitudinal central tunnel itself to now be releasable and adjustable. This is brought about, for example, by the connecting member being screwed to the longitudinal central tunnel, with a screw shank being adjustable in an oversized bore formed on the crossmember or in an elongated hole and, as a result, the crossmember being able to be aligned in its position with respect to the longitudinal central tunnel. The crossmember is, in particular, a cockpit crossmember which is connected at its longitudinal ends to the two A pillars of a vehicle body and is supported in a central region via a supporting frame against or on a longitudinal central tunnel of the motor vehicle. The supporting frame has two supporting elements directed downward from the crossmember, and the above-described connecting member which connects the two supporting elements at their ends facing the longitudinal central tunnel. The screwing of the connecting member to the longitudinal central tunnel in association with a certain possibility of adjusting the connecting member with respect to the longitudinal central tunnel, as long as the screws are not permanently tightened, makes it possible for manufacturing tolerances to be significantly better compensated for and, in addition, the installation of the crossmember on the motor vehicle body can be simplified by, first of all, all of the connections between the connecting member and the longitudinal central tunnel and the connecting member and the two supporting elements first of all only being fitted loosely and only being tightened after the crossmember, which is designed, for example, as a cockpit crossmember, is fully fitted in the motor vehicle, thus, in particular, enabling the build-up of internal stresses to be avoided and, at the same time, the installation of the crossmember on the motor vehicle body being simplified, since the crossmember does not have to be connected, as hitherto, at one end to the vehicle body and at the other end to the connecting member connected permanently to the longitudinal central tunnel.

The connecting member, when fixed on the longitudinal central tunnel, expediently bears against two mutually adjacent outer surfaces of the longitudinal central tunnel. This permits an optimum supporting position, since the crossmember can be supported against the longitudinal central tunnel of the motor vehicle in an essentially planar manner via the supporting elements and the connecting member and, as a result, stress peaks as would occur in the case of a point-type support can be avoided. At the same time, the at least partially planar bearing of the connecting member against the two mutually adjacent outer surfaces of the longitudinal central tunnel enables the connecting member to be precisely positioned with respect to the longitudinal central tunnel, thus simplifying the installation.

In an advantageous development of the crossmember according to the invention, the connecting member has reinforcing webs. Such reinforcing webs bring about stiffening of the connecting member, with the reinforcing webs preferably being arranged in the manner of a lattice on a connecting member side which faces the longitudinal central tunnel and thereby bringing about a stiffening of the connecting member in a plurality of directions. Furthermore, the reinforcing webs bring about the stiffening of the connecting member without substantially increasing the dead weight thereof. This is advantageous in particular for an energy balance of the motor vehicle, since the overall weight of the motor vehicle can be reduced by means of lighter individual parts and, as a result, its fuel consumption drops.

In a further advantageous embodiment of the solution according to the invention, the at least one fixing device for fixing the connecting member to the longitudinal central tunnel can be arranged in a recessed manner. This avoids direct touching contact with the often sharp-edged nuts or screw heads of the fixing device, thus, in particular, reducing the risk of injury during maintenance of the motor vehicle.

Further important features and advantages of the invention emerge from the subclaims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and are explained in more detail in the description below, with the same reference numbers referring to identical or similar or functionally identical components.

Other features which are considered as characteristic for the invention are set forth in the appended claims.

Although the invention is illustrated and described herein as embodied in crossmember, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
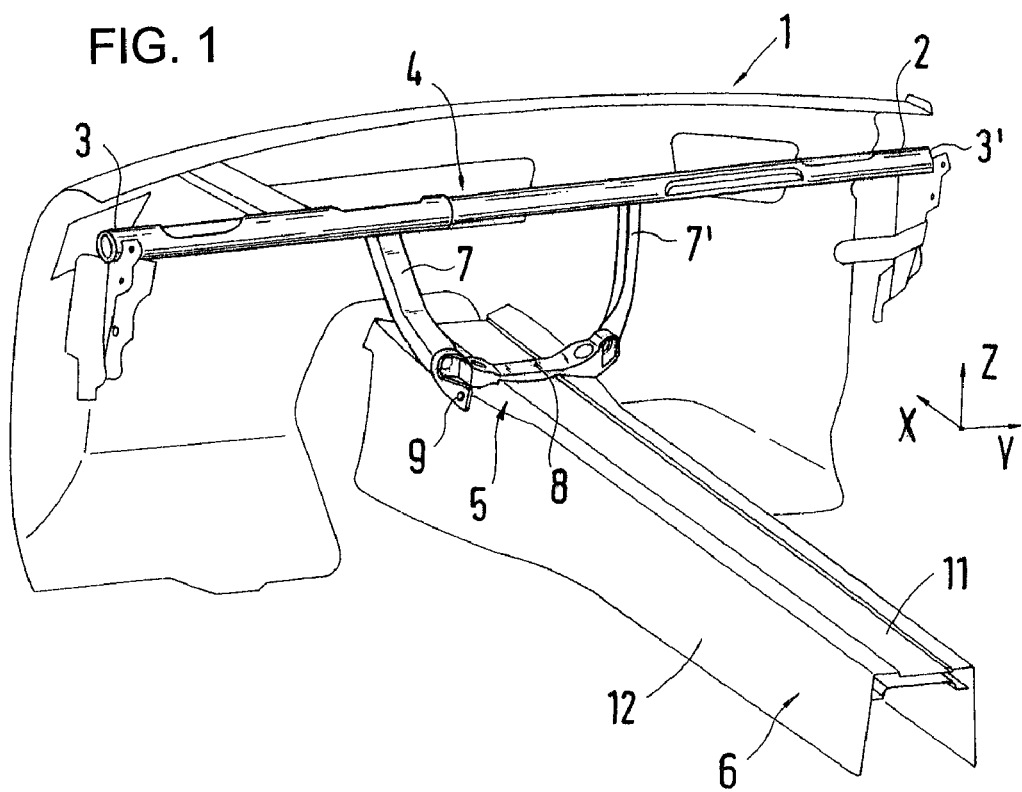
FIG. 1 is a partial perspective view of a crossmember according to the invention which is supported against a longitudinal central tunnel of a motor vehicle via supporting elements and a connecting member.

Referring now to the figures of the drawing in detail and first, particularly, to FIG. 1 thereof, there is shown a front end structure 1 of a motor vehicle that forms a front end of a passenger cell. A crossmember 2, here a cockpit crossmember 2 or transverse strut, which usually serves as a means of supporting a dashboard, is arranged on the front end structure 1 which is part of a vehicle body. The crossmember 2 is permanently connected at its longitudinal ends 3, 3' to A pillars of the motor vehicle, as a result of which it stiffens the motor vehicle in the transverse direction. The cockpit crossmember 2 is supported in a central region 4 via a supporting frame 5 against a longitudinal central tunnel 6 of the motor vehicle, thus enabling undesirable deformation of the crossmember 2, for example due to the load of the dashboard, to be avoided. The longitudinal central tunnel 6 usually serves as a tunnel for a motor vehicle drive shaft (not shown) which runs, for example, from a transmission to a rear axle of the motor vehicle.

The supporting frame 5 has two downwardly directed supporting elements 7, 7' and a connecting member 8 connecting the two supporting elements 7, 7' at their lower end. The supporting elements 7, 7' may be of single- or multi-part design, they being of single-part design in the exemplary embodiments shown. The crossmember 2 is therefore preferably downwardly supported via the connecting member 8 which rests on the longitudinal central tunnel 6. Downward in this case means counter to the Z direction, which usually constitutes the vertical component of a coordinate system. The longitudinal direction of the vehicle is referred to here as the X direction while the transverse direction of the vehicle is referred to as the Y direction.

In order, firstly, to facilitate the installation of the crossmember 2 on the front end structure 1 or on the longitudinal central tunnel 6 and, secondly, to very substantially be able to avoid material-loading internal stress states, the connecting member 8 can be fixed to the longitudinal central tunnel 6 via at least one fixing device 9 which, in particular during the installation of the crossmember 2 on the longitudinal central tunnel 6, permits the connecting member 8 to be aligned on the longitudinal central tunnel 6. An example of a suitable fixing device 9 is a screw connection with a screw element 10 (cf. FIG. 2).

As is evident from FIG. 1, the connecting member 8 rests on an upper tunnel surface 11 of the longitudinal central tunnel 6 and at the same time bears against a side surface 12 of the longitudinal central tunnel 6. The connecting member 8, when fixed on the longitudinal central tunnel 6, therefore bears against two mutually adjacent surfaces 11, 12 of the longitudinal central tunnel 6, as a result of which an essentially interlocking connection is obtained.

Figure 2:
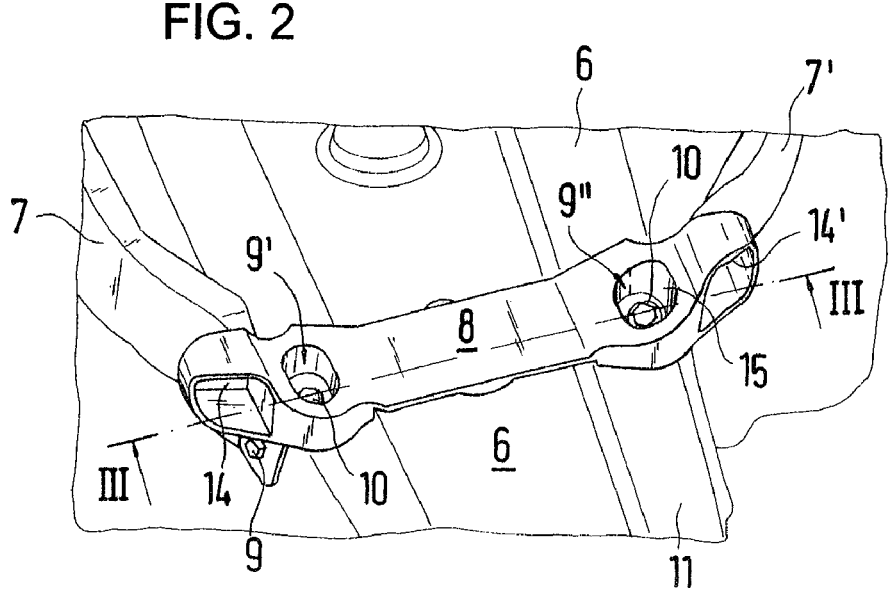
FIG. 2 is a detailed perspective view from above of the connecting member.
Figure 3:
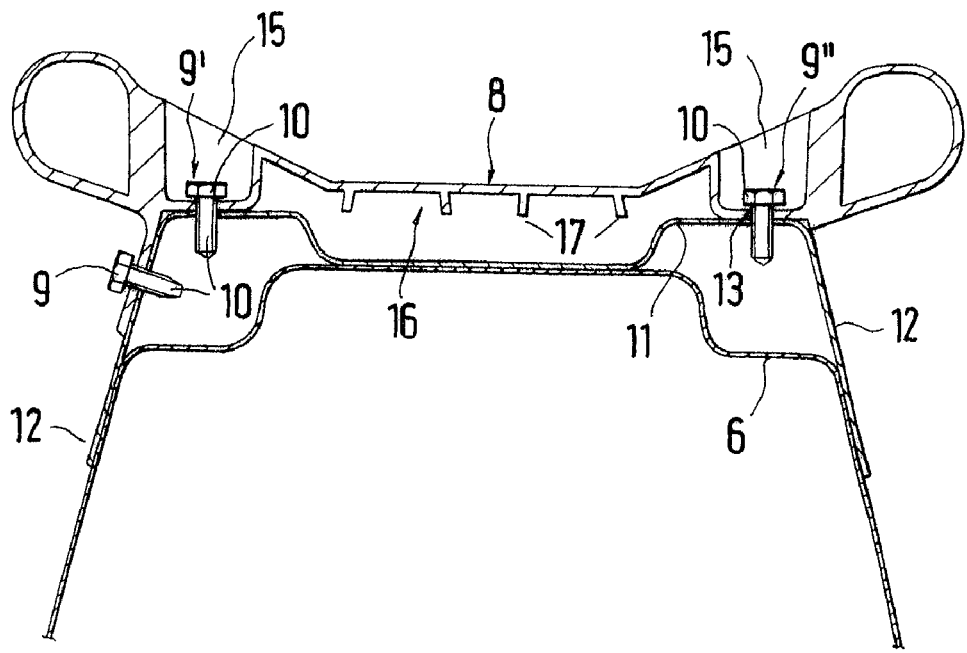
FIG. 3 is a sectional view taken through the longitudinal central tunnel with the connecting member along the section plane III-III in FIG. 2.
Figure 4:
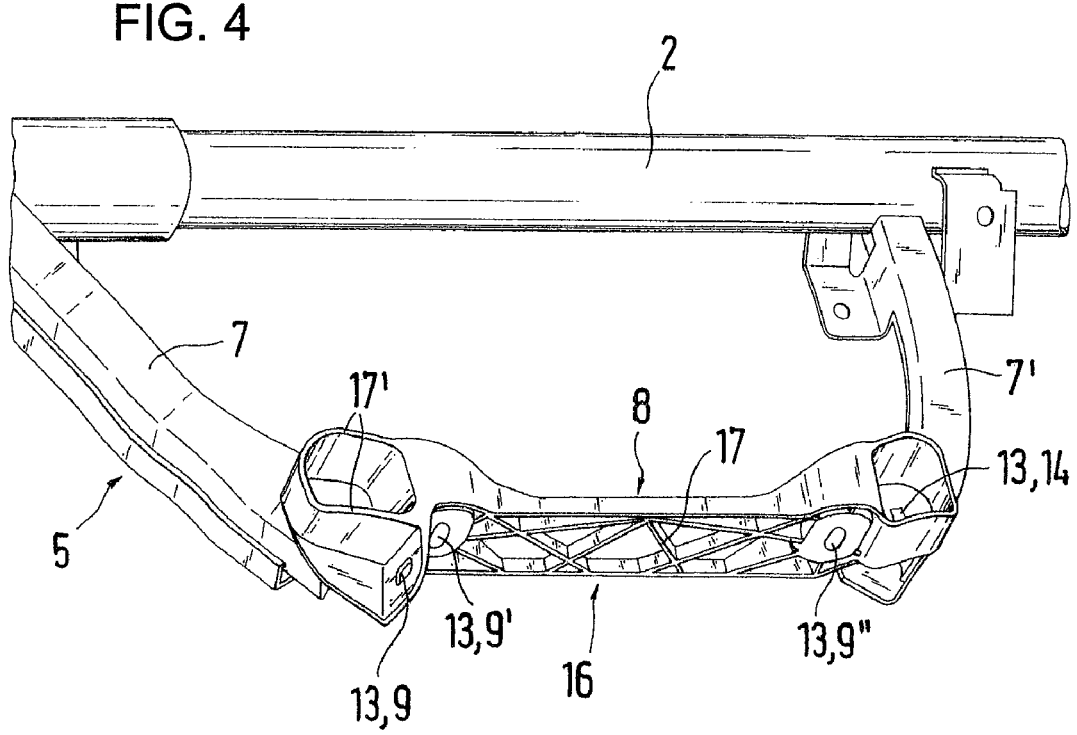
FIG. 4 is a perspective view, obliquely from below, of the connecting member.

In order to fix the connecting member 8 to the longitudinal central tunnel 6, according to FIG. 1 to 3 a total of three fixing devices 9, 9', 9" are provided, of which one fixes the connecting member 8 to the side wall or side surface 12 of the longitudinal central tunnel 6, while the two other fixing devices 9', 9" fix the connecting member 8 to the upper tunnel surface 11 of the longitudinal central tunnel 6. In this case, each fixing device 9, 9', 9" has, as mentioned above, at least one screw element 10 which penetrates the connecting member 8 preferably in an associated through opening, or passage opening 13 (cf. FIG. 4) and can be screwed into the longitudinal central tunnel 6 of the motor vehicle. In order now to be able to ensure that the connecting member 8 can be adjusted on the longitudinal central tunnel 6, the through openings 13 either have a larger diameter than the screw element 10 or are designed as an elongated hole, as illustrated in FIG. 4. A through opening 13 which is designed as an elongated hole provides a possibility of adjustment in one direction, while a through opening 13 with a diameter which is larger than the screw element 10 permits a possibility of adjustment in a plurality of directions. According to FIG. 4, the through openings 13 are designed as elongated holes, the longitudinal extent of which runs in the X direction, i.e. in the longitudinal direction of the vehicle, and thereby opens up a possibility of adjusting and positioning the connecting member 8 on the longitudinal central tunnel 6 in the longitudinal direction of the vehicle. It is to remain open here whether the through openings 13, as shown, for example, in FIG. 4, are arranged on the connecting member 8 or on the longitudinal central tunnel 6, the screw element 10 in the latter case not being screwable into the longitudinal central tunnel 6 but rather being designed as a screw and nut connection. An adjustment movement in the direction of the longitudinal extent of the elongated hole can be defined here in accordance with the size of the longitudinal extent of the elongated hole.

Figure 5:
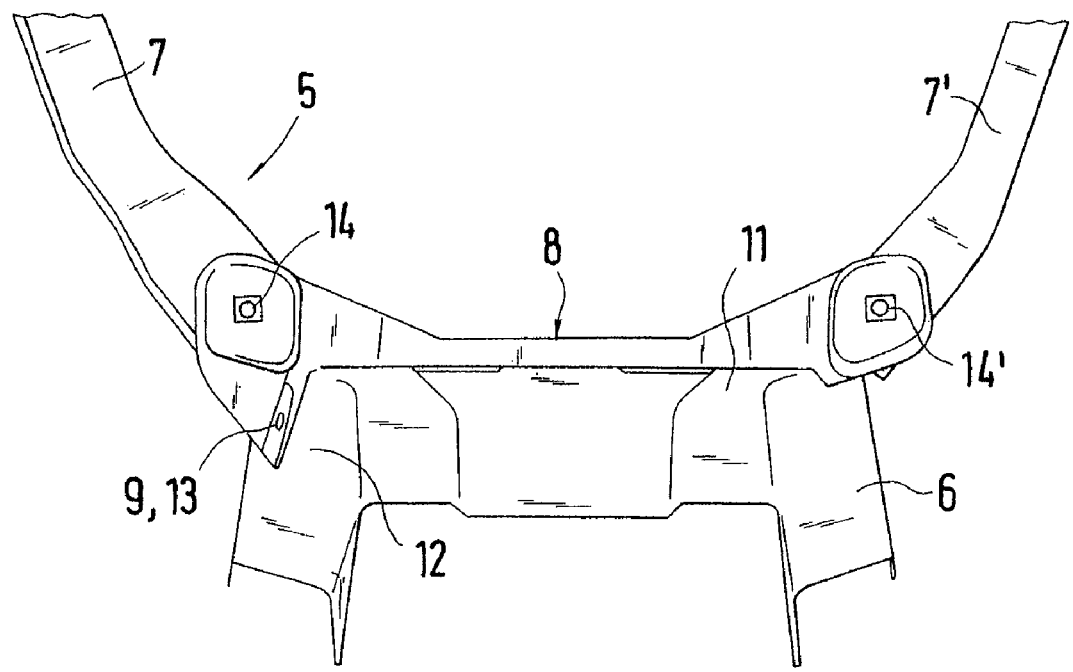
FIG. 5 is an illustration as in FIG. 4, but from a different perspective and with the longitudinal central tunnel.

In a similar manner, the connecting member 8 is connected to the two supporting elements 7, 7', with the supporting elements 7, 7' being held here on the connecting member 8 via an associated holding device 14, 14'. The holding devices 14, 14' can likewise in turn each have a screw element 10 which can be screwed, for example, into the respectively associated supporting element 7, 7' or into the connecting member 8. It is also conceivable that, in the connecting region between supporting element 7, 7' and the connecting member 8, through openings 13 are provided in both components, the screw element 10 reaching through them and with it being possible for the screw element 10 to be tightened by a nut (not shown). According to the invention, the holding devices 14, 14' are aligned in this case in such a manner that the supporting element 7, 7' can be aligned in the transverse direction of the vehicle, i.e. in the Y direction, and in the vertical direction, i.e. in the Z direction. This can take place, for example, by the connecting member 8 and the supporting element 7, 7' having, in the region of the holding devices 14, 14', an oversized through opening 13, i.e. the through opening 13 has a larger diameter than the screw element 10. Such an oversized passage bore 13 is illustrated, for example, in FIG. 5, the oversized through opening 13 here being arranged in the connecting member 8.

As can be seen from FIGS. 2 and 4, the fixing devices 9, 9', 9" and/or the screw elements 10 of the holding devices 14, 14' are preferably arranged in a recessed manner on the connecting member 8, thus enabling, in particular, direct and possibly harmful contact with a sharp-edged screw head of the screw element 10 to be avoided. In particular in FIG. 3, the recessed arrangement of the screw element 10 in a recess 15 can be clearly seen.

Looking at FIG. 4, it is apparent that the connecting member 8 has reinforcing webs 17 on its lower side 16 which faces the longitudinal central tunnel 6, the reinforcing webs serving to stiffen the connecting member 8. These reinforcing webs 17 are preferably arranged in the manner of a lattice, thus making it possible to stiffen the connecting member 8 in a plurality of directions. At the same time, the connecting webs 17 afford the great advantage over a solid profile that the connecting member 8 can be of significantly lighter design, which is of great advantage in particular in the manufacturing of sports vehicles. Reinforcing webs 17 are not only arranged on the lower side 16 but also on the longitudinal end sides of the connecting member 8, the reinforcing webs 17' bordering the holding devices 14, 14' here.

During the process to install the crossmember 2 on the front end structure 1 of the motor vehicle, first of all the fixing devices 9, 9', 9" and the two holding devices 14, 14' are inserted in a loose state and then the crossmember 2 is aligned with respect to the front end structure 1 with respect to the longitudinal central tunnel 6. Subsequently, the fixing device 9 is tightened first of all, followed successively by the fixing devices 9', 9". The tightening of the fixing devices 9 to 9" fixes the connecting member 8 fixedly to the longitudinal central tunnel 6. After the connecting member 8 is fixed to the longitudinal central tunnel 6, the screw elements 10 of the holding devices 14, 14' are successively tightened, thus producing a stiff connection between the longitudinal central tunnel 6 and the crossmember 2. The possibility of aligning the crossmember 2 in the X, Y and Z directions with respect to the longitudinal central tunnel 6 enables stress-free installation of the supporting frame 5 on the longitudinal central tunnel 6 to be achieved and, in addition, enables the installation to be simplified, since, in comparison to a conventional connecting member 8 permanently welded to the longitudinal central tunnel 6, manufacturing tolerances in the body shell of the motor vehicle can be better compensated for.

The invention claimed is:

1. A crossmember assembly in a motor vehicle, comprising:
    a crossmember having two ends connected to a motor vehicle body of the motor vehicle;
    a supporting frame supporting said crossmember in a central region against a longitudinal central tunnel of the motor vehicle, said supporting frame having two downwardly directed supporting elements and a connecting member connecting said two supporting elements at lower ends thereof;
    at least one fixing device configured to affix said connecting member to said longitudinal central tunnel and to align said connecting member on said longitudinal central tunnel; and
    a holding device holding each said supporting element on said connecting member, said holding devices permitting said supporting elements to be adjusted in a transverse direction of the motor vehicle and vertically.

2. The crossmember assembly according to claim 1, wherein said crossmember is a cockpit crossmember connected to A-pillars of the motor vehicle body.

3. The crossmember assembly according to claim 1, wherein said connecting member, when fixed on said longitudinal central tunnel, bears against two mutually adjacent surfaces of said longitudinal central tunnel.

4. The crossmember assembly according to claim 1, wherein said at least one fixing device is one of three fixing devices, with one fixing device affixing said connecting member to a side surface of said longitudinal central tunnel and two other fixing devices affixing said connecting member to an upper tunnel surface of said longitudinal central tunnel.

5. The crossmember assembly according to claim 1, wherein said at least one fixing device has a screw element penetrating said connecting member in an associated through opening and configured to be screwed into said longitudinal central tunnel of the motor vehicle.

6. The crossmember assembly according to claim 5, wherein said through opening is an oblong hole permitting said connecting member to be adjusted in a longitudinal direction of the vehicle.

7. The crossmember assembly according to claim 1, wherein said connecting member or said supporting element has an oversized through opening formed in a region of said holding device, and wherein said screw element reaches through said through opening, thus permitting said supporting elements to be adjusted in the transverse direction of the vehicle and vertically.

8. The crossmember assembly according to claim 1, wherein said connecting member has at least one reinforcing web.

9. The crossmember assembly according to claim 1, wherein said at least one fixing device and/or a screw element for holding said supporting element is disposed in a recessed manner on said connecting member.

* * * * *